Nov. 28, 1950 U. LAMM 2,532,107
MEANS FOR PROTECTING INVERTERS AGAINST DISTURBANCES
Filed May 13, 1947
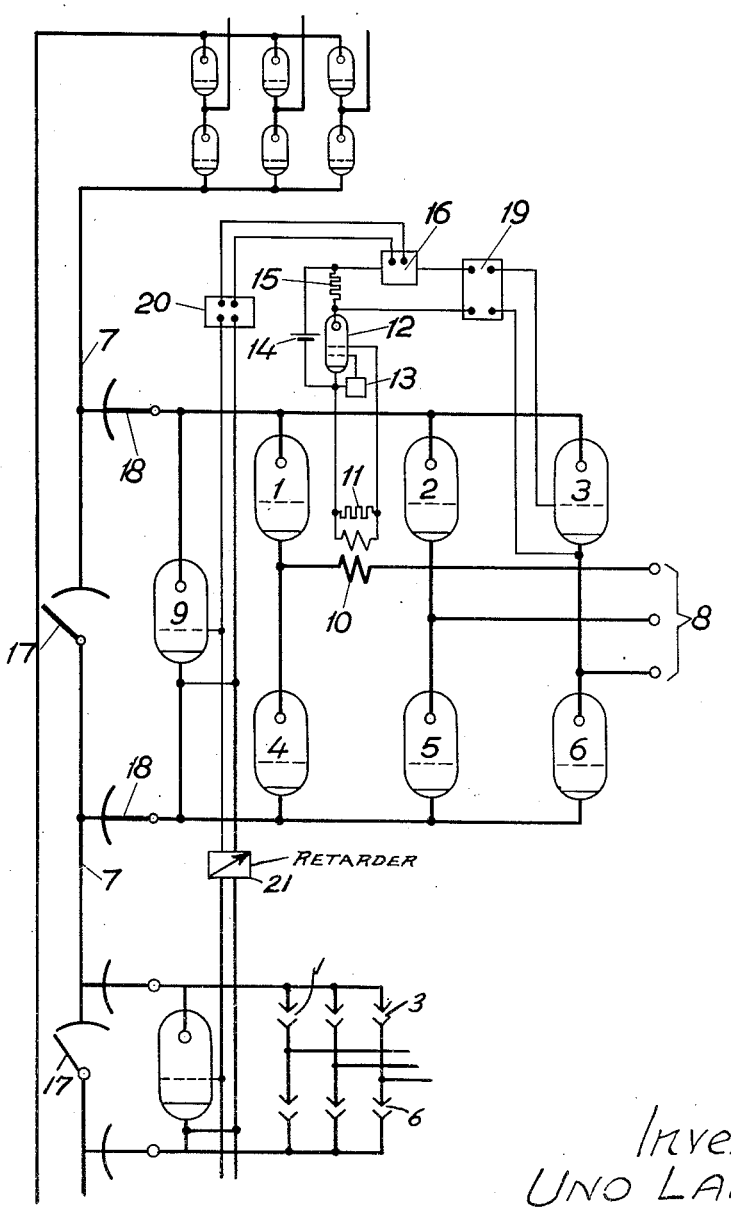
Inventor
UNO LAMM
By Ames Aiken
Attorney.

Patented Nov. 28, 1950

2,532,107

UNITED STATES PATENT OFFICE 2,532,107

MEANS FOR PROTECTING INVERTERS AGAINST DISTURBANCES

Uno Lamm, Ludvika, Sweden, assignor to Allmänna Svenska Elektriska Aktiebolaget, Vasteras, Sweden, a corporation of Sweden Application May 13, 1947, Serial No. 747,800
In Sweden May 14, 1946

7 Claims. (Cl. 321—11)

For protecting static current converters in general against disturbances, it has previously been proposed to connect bypass valves in parallel to said converters on the direct current side, said valves being released at a disturbance. According to earlier, unpublished propositions, such a release has been effected as a consequence of disturbances in a rectifier, for instance back arcing, and also of external voltage surges. In inverters, however, many disturbances, if not the majority thereof, occur on the alternating current side, for instance by reason of a lowering of the voltage or a deformation of the voltage curve, especially if the inverter feeds a vast alternating current network. Such a disturbance on the alternating current side generally causes a deficient commutation in the inverter, which as known is dangerous. For eliminating such disturbances in the inverter, bypass valves connected in parallel thereto are according to the present invention released as a consequence of a disturbance on the alternating current side.

As a rule, the bypass valve—or several series-connected bypass valves—are connected directly between the direct current terminals of the converter. In two-way converters it is, however, also possible to connect one or more series-connected bypass valves between each direct current terminal and an accessible neutral point of a transformer. Since in such case the half of the converter, which is not connected in parallel to the bypass valve, will operate as a one-way converter, the transformer will have a direct current magnetisation, and it should then be connected with respect hereto, for instance in a zigzag connection.

The releasing of a bypass valve connected in parallel to the inverter in any of the ways just referred to means a complete unloading of the inverter as such, but at the same time it means a short-circuit on the direct current side of the inverter, for which reason it should be combined with a current regulation or limitation at the direct current source (for instance a rectifier installation) for preventing overcurrents.

Disturbances on the alternating current side may essentially be divided in three different kinds as regards the severity. In the easiest case the disturbance disappears spontaneously after a short time, for instance after a part of a cycle or a few cycles, but it is, however, as long as it lasts, sufficiently serious for causing a deficient commutation in the inverter. It may, however, often be removed by a normal protective device for a deficient commutation, acting for instance to cause the inverter to commutate to the next phase in the phase sequence. Instead of using such a device it may, however, sometimes be advisable to cause the bypass valve to act also in such a case and to absorb the whole direct current and thus unload the inverter during the time immediately following the missing commutation, until the current limitation has entered into function.

A case of somewhat more severe nature is when the disturbance remains during a somewhat longer time, for instance about a second or a few seconds, generally depending on that the fault remains still longer on a portion of the alternating current network but this portion is disconnected. The present invention is especially provided for this case. The restitution of normal operation should then be effected automatically, as soon as the fault on the alternating current network has been removed. The alternating current side then again obtains an essentially normal voltage, while the inverter is still short-circuited by the bypass valve (however not so as to permit a feeding of energy thereinto from the alternating current side). In order to permit the restitution of normal operation, the inverter should then be controlled so as to give a low direct current voltage, at any rate so far as to give a rectifier voltage during parts of the cycles, because the normally operating valves can then spontaneously absorb the current from the short-circuiting bypass valve. If the converter is provided with current regulation, it controls itself automatically in this manner as soon as the regulation and blocking occasionally acting during the disturbance have ceased.

If the disturbance is of a still more severe character than that just referred to, it can, as a rule, not be removed by automatic means but necessitates a personal action. Such steps may then for instance be taken, that the measures already described cause a signal to the operator after a certain time, if the operator has not already been warned in order to take more radical steps, for instance putting the direct current source out of action (blocking a rectifier installation).

For realizing the invention in practice there is a multitude of different ways. As already mentioned, the releasing impulse may be directly derived for instance from a lowering of the alternating current voltage, in which case it only requires very simple operations. In some cases it may, however, be advisable to derive it in a more indirect way, an example of which is diagrammatically illustrated in the accompanying drawing. This drawing shows a three-phase two-way inverter having six valves 1—6 connected to direct current terminals 7 and alternating current terminals 8. On the direct current side, it may for instance be connected in series (and also in parallel) to other units (one of which is shown diagrammatically in the drawing) to form a high voltage inverter installation.

A bypass valve 9 is connected in parallel to the inverter. Each valve of the inverter is provided with a protective device against missing commutation, which has, however, only been shown for one valve. Thus, a current transformer 10 has been connected in the alternating current conductor (possibly on the distant side of the main transformer), the secondary winding of said transformer operating on a resistance 11 connected between the cathode and a grid of an electronic tube 12. Between another grid and the cathode of the same tube, there is connected an impulse organ 13, which is not shown in detail, and which may be common to all the valves of the inverter. This organ sends at certain intervals positive impulses to the corresponding grid. Between the anode and the cathode of the tube 12 and across a resistance 15 in series therewith, there is connected a voltage source 14. The voltage across the resistance 15 is impressed between the grid and the cathode of the main valve 3.

The arrangement now described, which is known in principle by an article of the inventor in the journal "Aseas Tidning" November-December 1943, operates in the following manner. Normally the valve 1 commutates to the valve 2. If this commutation should fail for some reason, this is marked for instance by the current in the current transformer 10 continuing during a part of a cycle, when it should not flow normally. The grid of the electronic tube 12 connected to the resistance 11 is then positive. At a suitable instant during this cycle period, the impulse organ 13 sends a positive impulse to its grid, and as both the grids to the tube 12 then become positive, the tube will be conductive. There will then be a voltage across the resistance 15, which through an insulating impulse organ 19 sends a positive impulse to the grid of the valve 3, thus causing this valve to ignite instead of the failing valve 2.

If the cause of the failure is of rapidly transitory character, the fault may generally be removed by the arrangement now described. If, on the contrary, the cause remains during a longer time, for instance during a predetermined number of cycles, the arrangement now to be described enters into function. In the connection between the resistance 15 and the grid circuit of the valve 3, there is connected an integrating or impulse counting relay 13 which, as soon as there has been a certain number of impulses or their integrated electrical value has risen to a certain amount, sends a positive impulse through a member 20 to the grid of the bypass valve 9 so as to cause this valve to ignite and to short-circuit the entire inverter.

As already mentioned, it may sometimes be advisable to cause the organ responsive to the failure of commutation, for instance the tube 12 in the form illustrated, to act directly releasing on the bypass valve instead of commutating the current to the next valve in the phase sequence (valve 3 in the example illustrated). The commutation failure as is known, always causes a rush of current, the rate of increase of which is certainly limited by the generally present direct current reactor, but which may still be sufficient to cause for instance an increase of the period of commutation at the following commutations with the risk of new failures and other disturbances before the current limitation has entered into action. For entirely liberating the inverter of such commutation and other difficulties, it may be advisable to cause the bypass valve to enter into function already at the first commutation failure, i. e. to cause the tube 12 or corresponding member to operate the bypass valve directly. As soon as the current has been limited to a permissible value and the commutation phase has been adjusted if necessary and possibly other steps have been taken for preventing a repetition of the failure, it is, as a rule, advisable to put the inverter again into operation in the way described or in another way.

If several inverters are connected in series, the impulses to their bypass valves may be sent to them all, in which case they may be adjusted in time as by an adjustable retarder 21 so as to occur gradually for the different inverters, whereby a too sudden reduction of the total voltage is avoided. If the retarder is set to be ineffective, the valves of the different inverters are released simultaneously.

As shown in the drawing, there may also be connected in parallel to the inverter a disconnecting switch 17, which may be thrown in if a single rectifier shall be taken out of operation for a comparatively long period. In such case the direct current terminals 7 should be connected next to the switch 17 and separate disconnecting switches 18 be inserted between the switch 17 and the inverter with its bypass valve, so that the whole inverter can be relieved of its voltage, while the other ones in the series continue their operation.

As in the patent application Serial No. 735,920 certain of the normal operating valves of the inverter may serve as bypass valves. In this case two valves lying in series between the direct current terminals are released simultaneously, which never occurs in normal operation.

As compared with the previously proposed methods of protecting an inverter by entirely interrupting the energy delivery of the direct current source the present invention offers the advantage that the direct current source—for instance a rectifier installation—is maintained in full operation, whence the energy delivery can be restored very rapidly, as soon as the disturbance has been removed.

I claim as my invention:

1. In an inverter having a plurality of valves, at least some of which are normally blocked when certain others are active, means responsive to a disturbance on the alternating current side of the inverter of a nature likely to cause a failure of commutation acting to open and keep open a direct valve path between direct current terminals of the inverter.

2. An inverter as claimed in claim 1 in which said means is responsive to a reduction of voltage on the alternating current side.

3. An inverter as claimed in claim 1 in which said means is responsive to a failure of commutation of said inverter.

4. An inverter as claimed in claim 1 in which said means is responsive to a number of commutation failures of said inverter.

5. An installation comprising a plurality of inverters each having a plurality of valves at least some of which are normally blocked during at least a part of the cycle of operation, and means responsive to a disturbance on the alternating current side of the inverter of a nature likely to cause a failure of commutation to release at least one of the normally blocked valves in each inverter simultaneously during such part of the cycle.

6. An installation comprising a plurality of inverters each having a plurality of valves at least some of which are normally blocked during at least a part of the cycle of operation, and means responsive to a disturbance on the alternating current side of the inverter of a nature likely to cause a failure of commutation to release at least one of the normally blocked valves in each inverter gradually during such part of the cycle.

7. A direct current transmission system comprising a direct current source, means for limiting the current thereof, an inverter fed by said current source having a plurality of valves at least some of which are normally blocked when certain others are active, means responsive to a disturbance on the alternating current side of the inverter of a nature likely to cause a failure of commutation and acting to open and keep open a direct valve path between direct current terminals of the inverter.

UNO LAMM.

REFERENCES CITED

The following references are of record in the file of this patent:

UNITED STATES PATENTS

| Number | Name | Date |
| --- | --- | --- |
| 2,064,021 | Ludwig | Dec. 15, 1936 |
| 2,119,865 | Lamm | June 7, 1938 |

FOREIGN PATENTS

| Number | Country | Date |
| --- | --- | --- |
| 88,730 | Sweden | Mar. 9, 1937 |
| 90,345 | Sweden | Sept. 28, 1937 |